(12) United States Patent
Michaels et al.

(10) Patent No.: US 11,454,724 B2
(45) Date of Patent: Sep. 27, 2022

(54) LIDAR BEAM WALK-OFF CORRECTION

(71) Applicant: OURS Technology, LLC, Palo Alto, CA (US)

(72) Inventors: Andrew Steil Michaels, Santa Clara, CA (US); Sen Lin, Santa Clara, CA (US)

(73) Assignee: OURS Technology, LLC, Mountain View, CA (US)

( * ) Notice: Subject to any disclaimer, the term of this patent is extended or adjusted under 35 U.S.C. 154(b) by 0 days.

(21) Appl. No.: 17/343,511

(22) Filed: Jun. 9, 2021

(65) Prior Publication Data

US 2021/0389470 A1 Dec. 16, 2021

Related U.S. Application Data

(60) Provisional application No. 63/038,450, filed on Jun. 12, 2020.

(51) Int. Cl.
| | |
|---|---|
| *G01S 17/26* | (2020.01) |
| *G01S 17/931* | (2020.01) |
| *G01S 17/89* | (2020.01) |
| *G01S 7/481* | (2006.01) |
| *G01S 7/497* | (2006.01) |

(52) U.S. Cl.
CPC ............ *G01S 17/931* (2020.01); *G01S 7/481* (2013.01); *G01S 7/497* (2013.01); *G01S 17/26* (2020.01); *G01S 17/89* (2013.01)

(58) Field of Classification Search
None
See application file for complete search history.

(56) References Cited

U.S. PATENT DOCUMENTS

| | | | | |
|---|---|---|---|---|
| 3,200,698 | A * | 8/1965 | Keith | ...................... G01S 17/08 |
| | | | | 356/5.14 |
| 5,825,465 | A * | 10/1998 | Nerin | ...................... G01S 17/58 |
| | | | | 356/28.5 |
| 2009/0123158 | A1 | 5/2009 | Ray et al. | |
| 2017/0370676 | A1* | 12/2017 | Volfson | ..................... F41G 3/06 |
| 2018/0224368 | A1* | 8/2018 | Spruit | ................ G01N 15/0205 |
| 2019/0018120 | A1 | 1/2019 | Efimov et al. | |

(Continued)

FOREIGN PATENT DOCUMENTS

WO 2020219145 A1 10/2020

OTHER PUBLICATIONS

Ruiz, "Compact Dual-Polarization Silicon Integrated Couplers for Multicore Fibers", arXiv:2102.08918v1 [physics.optics] Feb. 17, 2021, p. 1-8 (Year: 2021).*

(Continued)

*Primary Examiner* — Hovhannes Baghdasaryan
(74) *Attorney, Agent, or Firm* — Freestone Intellectual Property Law PLLC; Aaron J. Visbeek; William J. Pigott

(57) ABSTRACT

A light detection and ranging (LIDAR) device includes a pixel, a mirror, and a birefringent material. The pixel is configured to emit light having a first polarization orientation. The mirror is configured to reflect the light to a surface. The birefringent material is disposed between the pixel and the mirror. The birefringent material introduces an offset in a position of the emitted light having the first polarization orientation propagating through the birefringent material. The birefringent material shifts a reflected beam in space horizontally back on the pixel.

18 Claims, 7 Drawing Sheets

(56) References Cited

U.S. PATENT DOCUMENTS

2020/0103502 A1 4/2020 Talty et al.
2020/0150241 A1 5/2020 Byrnes et al.

OTHER PUBLICATIONS

International Searching Authority, Patent Cooperation Treaty, European Application No. PCT/US2021/037007, Notification Date: Sep. 20, 2021, 4 pages.
International Searching Authority, Patent Cooperation Treaty, Written Opinion of the International Searching Authority, European Application No. PCT/US2021/037007, Notification Date: Sep. 9, 2021, 13 pages.

* cited by examiner

LIDAR BEAM WALK-OFF CORRECTION

CROSS-REFERENCE TO RELATED APPLICATIONS

This application claims priority to U.S. provisional Application No. 63/038,450 filed Jun. 12, 2020, which is hereby incorporated by reference.

TECHNICAL FIELD

This disclosure relates generally to imaging and in particular to a LIDAR (Light Detection and Ranging).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more FMCW LIDAR devices for sensing its environment.

BRIEF SUMMARY OF THE INVENTION

Implementations of the disclosure includes a light detection and ranging (LIDAR) system including a pixel, a mirror, and a birefringent material. The pixel is configured to emit light having a first polarization orientation. The mirror is configured to reflect the light to a surface. The birefringent material is disposed between the pixel and the mirror. The birefringent material causes an offset in a position of the light having the first polarization orientation and propagating through the birefringent material. The birefringent material shifts a reflected beam that has a second polarization orientation.

In an implementation, the birefringent material shifts the reflected beam in space horizontally back on the pixel. The second polarization orientation is orthogonal to the first polarization orientation. The offset in the position of the light having the first polarization orientation is different from the horizontal shift of the reflected beam having the second polarization orientation.

In an implementation, the birefringent material is angled with respect to the light incident on the birefringent material and the birefringent material is tilted with respect to the reflected beam incident on the birefringent material.

In an implementation, the mirror is configured as a rotating mirror.

In an implementation, the pixel includes a dual-polarization coupler configured to emit the light having the first polarization orientation and couple the reflected beam having the second polarization orientation into the pixel.

In an implementation, the pixel includes a transmitting grating coupler configured to emit the light having the first polarization orientation and a single polarization grating coupler oriented perpendicular to the transmitting grating coupler to receive the reflected beam having the second polarization orientation into the pixel.

In an implementation, the pixel includes a splitter configured to provide a first percentage of split light for being emitted by the pixel as the light and a second percentage of split light. The pixel also includes an optical mixer configured to generate an output by mixing the second percentage of split light with the reflected beam.

In an implementation, the LIDAR device further includes a lens disposed between the birefringent material and the mirror and the lens is configured to collimate the light emitted by the pixel.

In an implementation, the birefringent material includes at least one of $LiNO_3$ (Lithium Nitrate) or $YVO_4$ (Yttrium Orthovanadate).

Implementations of the disclosure include an autonomous vehicle control system for an autonomous vehicle including a light detection and ranging (LIDAR) device and a control system. The LIDAR device includes a pixel, a mirror, and a birefringent material. The pixel is configured to emit light having a first polarization orientation and the pixel includes an optical mixer configured to receive a reflected beam of the light reflecting off of targets in an environment of the autonomous vehicle. The mirror is configured to reflect the light to the targets. The birefringent material introduces an offset in a position of the light having the first polarization orientation propagating through the birefringent material. The birefringent material shifts the reflected beam in space horizontally back on the pixel. The reflected beam has a second polarization orientation orthogonal to the first polarization orientation. One or more processors are configured to control the autonomous vehicle in response to an output of the optical mixer of the pixel.

In an implementation, a tilt angle of the birefringent material and a thickness of the birefringent material are configured for detection of the targets at a detection distance of 50 meters or greater.

In an implementation, the mirror is configured as a rotating mirror.

In an implementation, the pixel includes a dual-polarization coupler configured to emit the light having the first polarization orientation and couple the reflected beam having the second polarization orientation into the pixel.

In an implementation, the pixel includes a transmitting grating coupler configured to emit the light having the first polarization orientation and a single polarization grating coupler oriented perpendicular to the transmitting grating coupler to receive the reflected beam having the second polarization orientation into the pixel.

In an implementation, the pixel includes a splitter configured to provide a first percentage of split light for being emitted by the pixel as the light and a second percentage of split light and the optical mixer is configured to generate the output by mixing the second percentage of split light with the reflected beam.

In an implementation, the offset in the position of light having the first polarization orientation is different from the horizontal shift of the reflected beam having the second polarization orientation.

Implementations of the disclosure include an autonomous vehicle including a pixel a birefringent material, and a control system. The pixel is configured to emit infrared light having a first polarization orientation and configured to receive infrared reflected light reflected from targets in an environment of the autonomous vehicle. The birefringent material introduces an offset in a position of the infrared light propagating through the birefringent material and the birefringent material shifts an infrared reflected beam in space horizontally back on the pixel. The infrared reflected beam has a second polarization orientation orthogonal to the first polarization orientation. The control system is configured to control the autonomous vehicle in response to the infrared reflected beam.

In an implementation, the autonomous vehicle includes a rotating mirror configured to direct the infrared light to the targets while the rotating mirror is in a first position. The rotating mirror is configured to direct the infrared reflected beam back to the pixel when the rotating mirror is in a second position different from the first position.

In an implementation, the pixel includes a dual-polarization coupler configured to emit the infrared light having the first polarization orientation and couple the infrared reflected beam having the second polarization orientation into the pixel.

In an implementation, the pixel includes a transmitting grating coupler configured to emit the infrared light having the first polarization orientation. The pixel also includes a single polarization grating coupler oriented perpendicular to the transmitting grating coupler to receive the infrared reflected beam having the second polarization orientation into the pixel.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1:
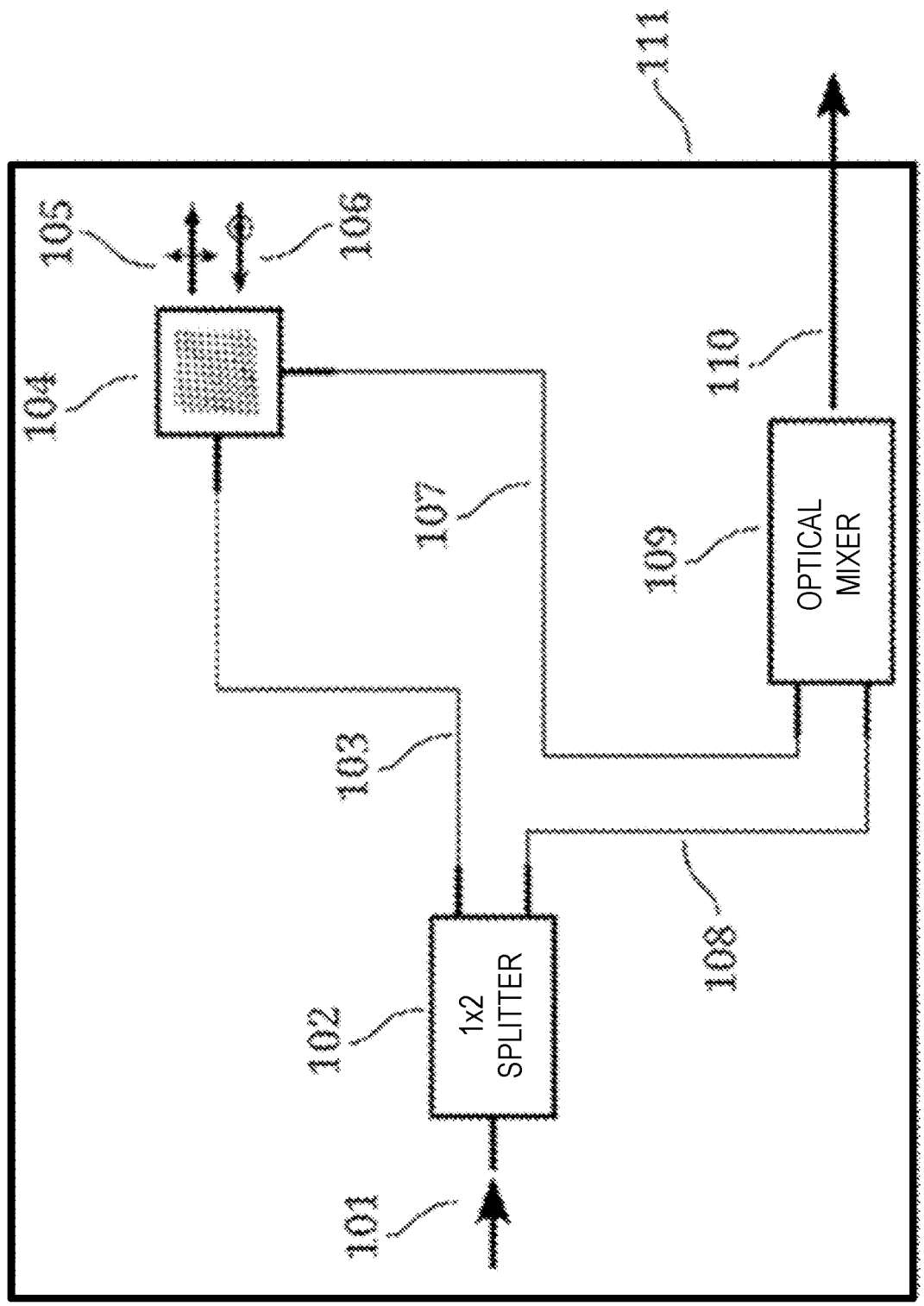
FIG. 1 illustrates a diagram of an implementation of a pixel of a LIDAR device, in accordance with implementations of the disclosure.

Implementations of LIDAR beam correction are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

In aspects of this disclosure, the term "transparent" may be defined as having greater than 90% transmission of light. In some aspects, the term "transparent" may be defined as a material having greater than 90% transmission of visible light.

Frequency Modulated Continuous Wave (FMCW) LIDAR directly measure range and velocity of an object by directing a frequency modulated, collimated light beam at the object. The light that is reflected from the object is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

FMCW LIDAR can take advantage of integrated photonics for improved manufacturability and performance. Integrated photonic systems typically manipulate single optical modes using micron-scale waveguiding devices.

A LIDAR system may include of one or more continuously moving mirrors which steer the outgoing light towards a target at range and reflect the received light from that target into a receiver. Due to the transit time for light moving from the LIDAR to a target and back, the continuous motion of the mirror causes the received light to move away from the few-micron-sized transceiver. This "beam walk-off" effect can lead to a reduction in system performance.

In implementations of the disclosure, an apparatus for correcting beam walk-off in LIDAR applications may include a polarization-diverse coherent pixel and a tilted piece of birefringent material.

Light may be emitted from the coherent pixel with polarization A which passes through the birefringent material. As the light passes through the birefringent material, the beam becomes offset relative to the source as a result of refraction. This light leaves the LIDAR system and reflects off of a diffuse surface at some distance from the system.

Light reflected off of a diffuse surface may have its polarization randomized. The light in the polarization orthogonal to the emitted polarization (A) propagates back through the birefringent material, which introduces a different offset to the beam compared to the emitted light. This beam illuminates the polarization-diverse coherent pixel which receives the light. The offset to the beam to illuminate the polarization-diverse coherent pixel may increase the signal strength received by the polarization-diverse coherent pixel and thus increase a signal measurement accuracy of a LIDAR device and/or lower the power required to operate the LIDAR device.

The birefringent material and geometry can be selected to choose a particular set of transmit and receive offsets which mitigate beam walk-off in LIDAR systems. In some implementations of the disclosure, the birefringent material and geometry is selected to increase the beam signal for imaging targets that are between 50 meters and 1000 meters from the LIDAR device.

FIG. 1 illustrates a diagram of an implementation of a pixel 111 of a LIDAR device, in accordance with implementations of the disclosure. Pixel 111 may be used in conjunction with a birefringent slab of birefringent material to correct for beam walk-off. The illustrated implementation of pixel 111 includes a 1×2 splitter 102, an optical mixer 109, and a dual-polarization grating coupler 104.

Light 101 enters pixel 111 and can be split by a splitter (e.g. 1×2 splitter 102). Light 101 may be infrared laser light generated by a continuous wave laser. In some implementations, the laser light may be collimated. For example, X % of the light (a first percentage of the light) leaves the splitter in the top interconnect 103 and is routed through dual-polarization grating coupler 104, which may emit first polarized light 105 (e.g. TE-polarized light). The first percentage of the light may be between 70% and 99%, in some implementations. First polarized light 105 may be coupled through a lens and reflected off of a mirror onto a target scene, in some implementations. First polarized light 105 may be uncollimated light and be a diverging beam that is collimated by the lens, in some implementations.

Light 106 returning to the coherent pixel 111 may have a second polarized component 106 (e.g. TM-polarized light) which is coupled back into the coherent pixel 111 by the dual-polarization grating coupler 104. Thus, dual-polarization grating coupler 104 may emit light having a first polarization orientation (e.g. TE-polarized light) and couple the reflected beam (light 106) having the second polarization orientation (e.g. TM-polarized light) into pixel 111. This light coupled into pixel 111 is routed along an interconnect 107 different from the transmit route to an optical mixer 109 which mixes the returning optical field in interconnect 107 with the remaining Y % of the light (a second percentage of the light) that was split off from the 1×2 splitter 102 into the bottom interconnect 108. The second percentage of the light may be between 1% and 30%, in some implementations. The reflected beam (light 106) may be reflected/scattered off a target in an environment of an autonomous vehicle, in some implementations. The output 110 from optical mixer 109 (of which there may be more than one) is processed by a receiver optoelectronic circuit. Hence, optical mixer 109 is configured to generate output 110 by mixing the second percentage of light (Y %) split off by splitter 102 into interconnect 108 with the reflected beam routed along interconnect 107.

Figure 2:
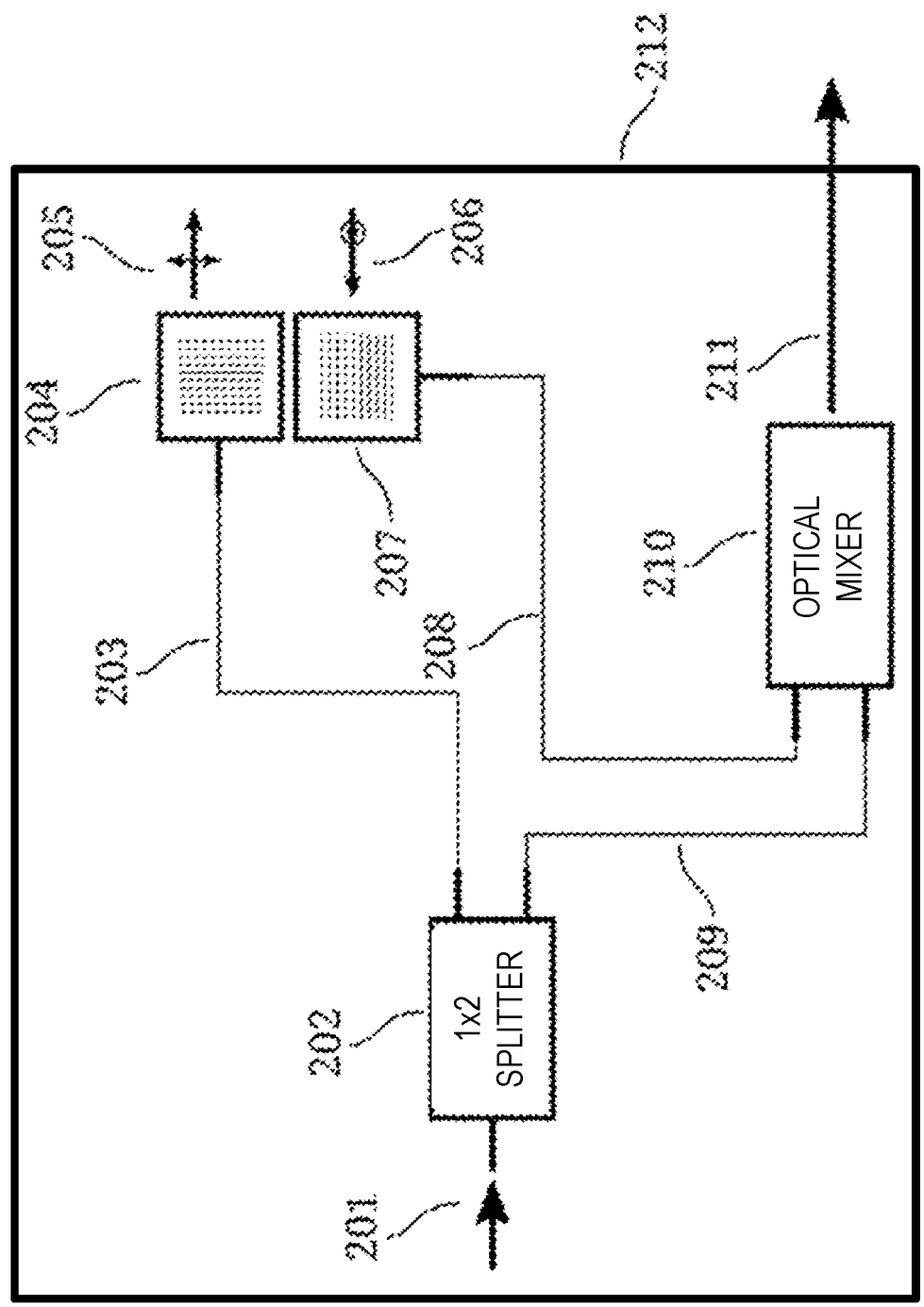
FIG. 2 illustrates a diagram of a pixel of a LIDAR device, in accordance with implementations of the disclosure.

FIG. 2 illustrates a diagram of a pixel 212 of a LIDAR device, in accordance with implementations of the disclosure. Pixel 212 may be used in conjunction with a birefringent slab of birefringent material to correct for beam walk-off. The illustrated implementation of pixel 212 includes a 1×2 splitter 202, an optical mixer 210, a transmitting grating coupler 204, and a single polarization grating coupler 207 oriented perpendicular to transmitting grating coupler 204.

Light 201 enters pixel 212 and can be split by a splitter (e.g. 1×2 splitter 202). Light 201 may be infrared laser light generated by a continuous wave laser. In some implementations, the laser light may be collimated. For example, X % of the light (a first percentage of the light) leaves the splitter in the top interconnect 203 and is routed into a single-polarization grating coupler 204, which emits first polarized light 205 (e.g. TE-polarized light). The first percentage of the light may be between 70% and 99%, in some implementations. First polarized light 205 may be coupled through a lens and reflected off of a mirror onto a target scene. First polarized light 205 may be uncollimated light and be a diverging beam that is collimated by the lens, in some implementations.

Light returning to coherent pixel 212 may have a second polarized component 206 (e.g. TM-polarized component) which is coupled back into the coherent pixel 212 by a single polarization grating coupler 207 which is oriented perpendicular to the transmitting grating coupler 204 such that it receives the orthogonal polarization of light. This light is routed along an interconnect 208 different from the transmit route to an optical mixer 210 which mixes the returning optical field in interconnect 208 with the remaining Y % of the light (a second percentage of the light) that was split off from the 1×2 splitter 202 into the bottom interconnect 209. The second percentage of the light may be between 1% and 30%, in some implementations. The reflected beam (light 206) may be reflected/scattered off a target in an environment of an autonomous vehicle, in some implementations. The output 211 from this mixer 210 (of which there may be more than one) is processed by a receiver optoelectronic circuit. Hence, optical mixer 210 is configured to generate output 211 by mixing the second percentage of light (Y %) split off by splitter 202 into interconnect 209 with the reflected beam routed along interconnect 208. In an implementation, splitter 202 can be removed and replaced with two independent light sources. The first of the two light sources may be coupled into interconnect 203 and the second light source may be coupled into interconnect 209.

Figure 3:
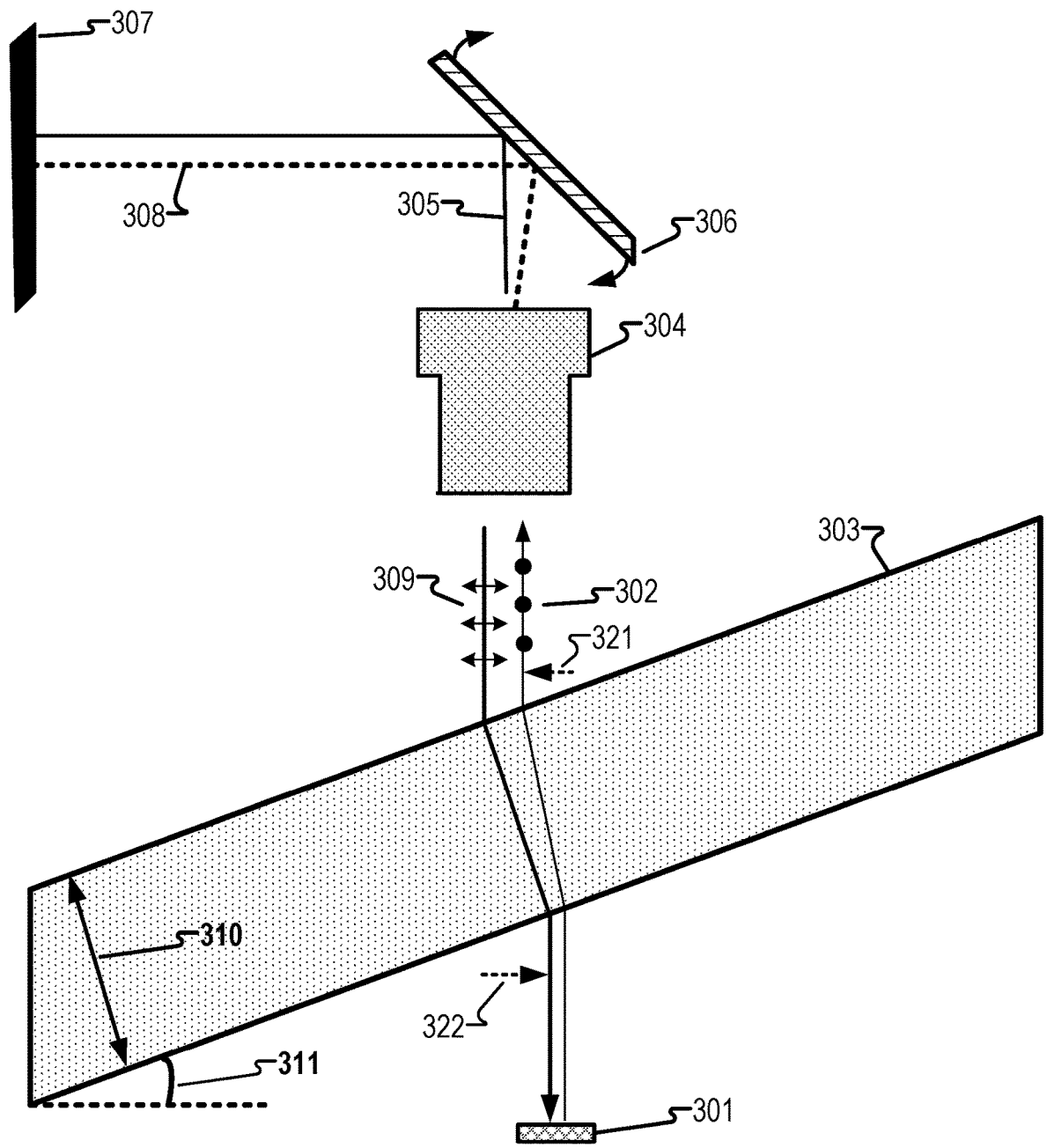
FIG. 3 illustrates how the pixel of FIG. 1 can be used in conjunction with a birefringent slab to correct for beam walk-off, in accordance with implementations of the disclosure.

FIG. 3 illustrates how the coherent pixel 111 of FIG. 1 can be used in conjunction with a birefringent slab 303 to correct for beam-walk off, in accordance with implementations of the disclosure.

The coherent pixel 301 emits light in the first polarization orientation 302 (e.g. "TE" polarization). This light propagates through the birefringent slab 303, which introduces a small offset 321 in the position of the beam relative to the coherent pixel 301. This beam of light may be collimated by a lens 304 and then reflected off of a continuously rotating mirror 306. In the illustration of FIG. 3, lens 304 is disposed between birefringent material 303 and mirror 306. The collimated light 305 propagates to a target diffuse surface 307 which reflects the light back towards the mirror as light 308. This reflected light 308 may have its polarization randomized and thus contain a second polarization component that is orthogonal to the first polarization component. This second polarization component light will propagate back to the mirror 306.

During the transit time to the surface and back, the mirror 306 has rotated by a small amount and thus the second polarization component may be reflected back at the lens 304 at a slightly different angle. The lens 304 refocuses the light, generating a second polarization component beam 309 with a slight offset relative to the transmitted beam 302 due to the change in angle induced by the mirror 306. This beam of light passes through the birefringent slab 303, which shifts the beam in space horizontally (e.g. shift 322) and shines back on the coherent pixel 301, which receives the light. Since the received polarization is different, the shift introduced by the birefringent material is different. In particular, the offset 321 in position light 302 having a first polarization orientation is different (smaller in FIG. 3) from the horizontal shift 322 of reflected beam 309 having the second polarization orientation that is orthogonal to the first polarization orientation. By selecting a particular birefringent material and controlling the thickness 310 of the slab 303 and the angle 311 of the slab 303, the relative shifts of the transmitted and received beams can be controlled. In the illustration of FIG. 3, the birefringent material is angled with respect to the beam 302 incident on the birefringent material and the birefringent material is tilted with respect to the reflected beam 309 incident on the birefringent material. In an implementation, tilt angle 311 of birefringent material 303 and thickness 310 of birefringent material 303 are configured for detection of targets at a detection distance of 50 meters or greater.

In some implementations, the birefringent material 303 may be $LiNO_3$ (Lithium Nitrate). In some implementations, the birefringent material 303 may be $YVO_4$ (Yttrium Orthovanadate). Those skilled in the art may choose these properties in order to optimally correct for the walk-off introduced by rotating mirrors for a wide range of target distances. For example, optimizing for a longer range target may include selecting a birefringent material having a larger shift 322 due to the longer round trip time for the beam to reflect off the target and propagate back to pixel 301. Since the longer round-trip time corresponds with a larger rotation angle of rotating mirror 306, a larger shift 322 may be desirable to direct reflected beam 309 to dual-polarization grating coupler 104 of pixel 301.

Figure 4:
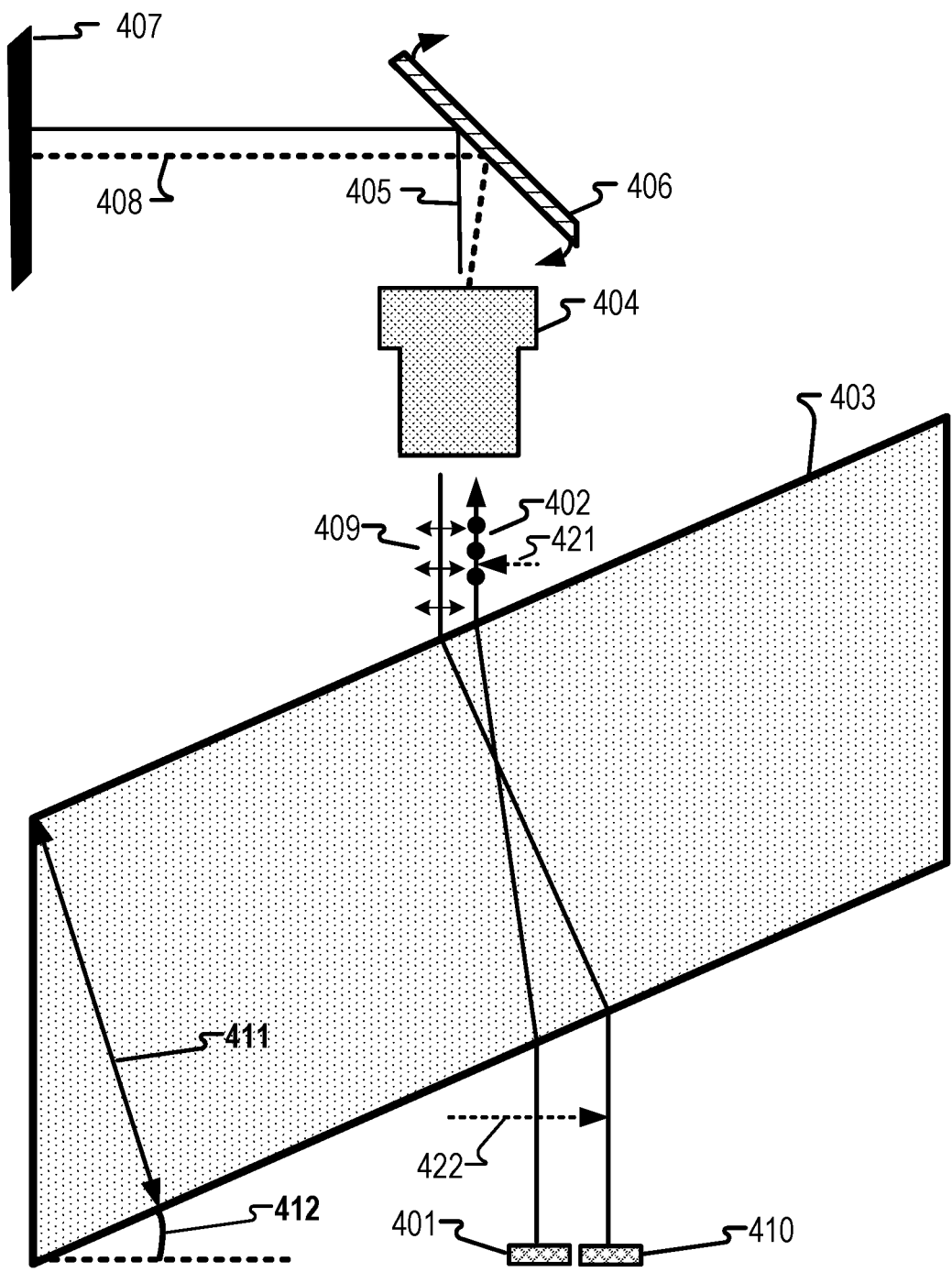
FIG. 4 illustrates how the pixel of FIG. 2 can be used in conjunction with a birefringent slab to correct for beam walk-off, in accordance with implementations of the disclosure.

FIG. 4 illustrates how coherent pixel 212 of FIG. 2 can be used in conjunction with a birefringent slab 403 to correct for beam walk-off, in accordance with implementations of the disclosure. In some implementations, the behavior of the device or apparatus of FIG. 4 can be similar to the device or apparatus depicted in FIG. 3 except that the birefringent slab 403 deflects the returning second polarization light 409 by a greater amount (e.g. shift 422) such that the received light 409 is refocused on an optical coupler 410 which is physically separate from the transmitting coupler 401. In an implementation, tilt angle 412 of birefringent material 403 and thickness 411 of birefringent material 403 are configured for detection of targets at a detection distance of 50 meters or greater.

In operation, transmitting coupler 401 emits light in the first polarization orientation 402 (e.g. "TE" polarization orientation). This light propagates through the birefringent slab 403, which introduces a small offset 421 in the position of the beam relative to the transmitting coupler 401. This beam of light may be collimated by a lens 404 and then reflected off of a continuously rotating mirror 406. In the illustration of FIG. 4, lens 404 is disposed between birefringent material 403 and mirror 406. The collimated light 405 propagates to a target diffuse surface 407 which reflects the light back towards the mirror as light 408. This reflected light 408 may have its polarization randomized and thus contain a second polarization component (e.g. TM-polarized light). This second polarization component light will propagate back to the mirror 406.

During the transit time to the surface and back, the mirror 406 has rotated by a small amount and thus the second polarization light may be reflected back at the lens 404 at a slightly different angle. The lens 404 refocuses the light, generating a second polarization beam 409 with a slight offset relative to the transmitted beam 402 due to the change in angle induced by the mirror 406. This beam of light passes through the birefringent slab 403, which shifts the beam in space horizontally (e.g. shift 422) and shines back on the optical coupler 410, which receives the light. Since the received polarization is different, the shift introduced by the birefringent material is different. In particular, the offset 421 in position of light 402 having a first polarization orientation is different (smaller in FIG. 4) from the horizontal shift 422 of reflected beam 409 having the second polarization orientation that is orthogonal to the first polarization orientation. In the illustration of FIG. 4, shift 422 is larger than offset 421 such that an optical path of reflected beam 409 (within birefringent material 403) crosses the optical path of beam 402 as reflected beam 409 propagates to optical coupler 410. In other implementations (not illustrated), shift 422 and offset 421 does not cause an optical path of reflected beam 409 to cross the optical path of beam 402 as reflected beam 409 propagates to optical coupler 410. By selecting a particular birefringent material and controlling the thickness 411 of the slab 403 and the angle 412 of the slab 403, the relative shifts of the transmitted and received beams can be controlled. In the illustration of FIG. 4, the birefringent material is angled with respect to beam 402 incident on the birefringent material 403 and the birefringent material 403 is tilted with respect to the reflected beam 409 incident on the birefringent material. In an implementation, tilt angle 412 of birefringent material 403 and thickness 411 of birefringent material 403 are configured for detection of targets at a detection distance of 50 meters or greater.

In some implementations, the birefringent material 403 may be $LiNO_3$ (Lithium Nitrate). In some implementations, the birefringent material 403 may be $YVO_4$ (Yttrium Orthovanadate). Those skilled in the art may choose these properties in order to optimally correct for the walk-off introduced by rotating mirrors for a wide range of target distances. For example, optimizing for a longer range target may include selecting a birefringent material having a larger shift 422 due to the longer round trip time for the beam to reflect off the target and propagate back to optical coupler 410. Since the longer round-trip time corresponds with a larger rotation angle of rotating mirror 406, a larger shift 422 may be desirable to direct reflected beam 409 to optical coupler 410.

The tilted piece of birefringent material 403 may be a part of the lens assembly or a chip package assembly. It may be integrated on the same chip as the coherent pixels. A plurality of coherent pixels and tilted birefringent pieces can be used together to realize more complex operations of an FMCW LIDAR. The birefringent piece may be motorized to change the tilting angle 412, in some implementations.

Figure 5A:
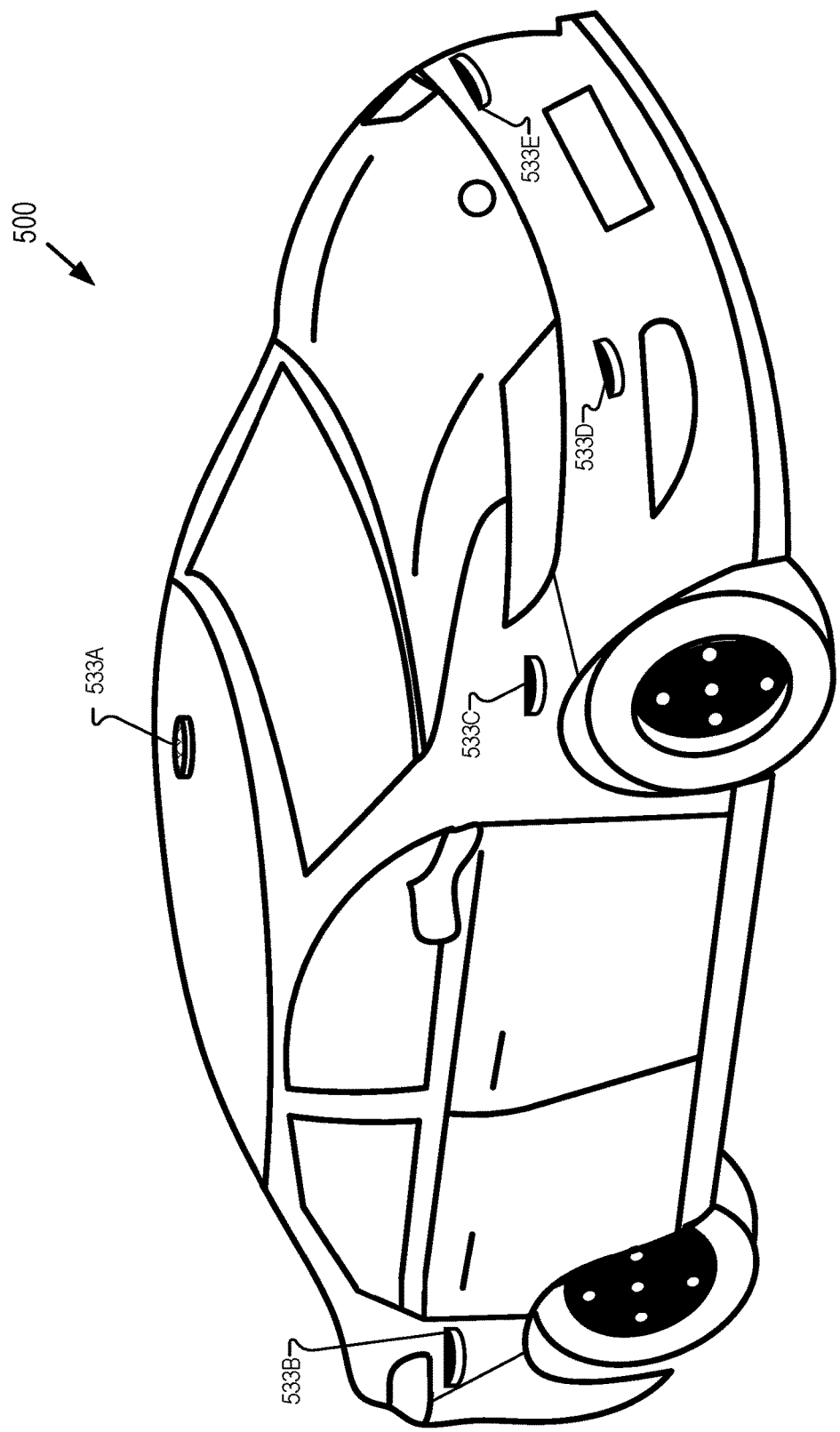
FIG. 5A illustrates an autonomous vehicle including an array of example sensors, in accordance with implementations of the disclosure.
Figure 5B:
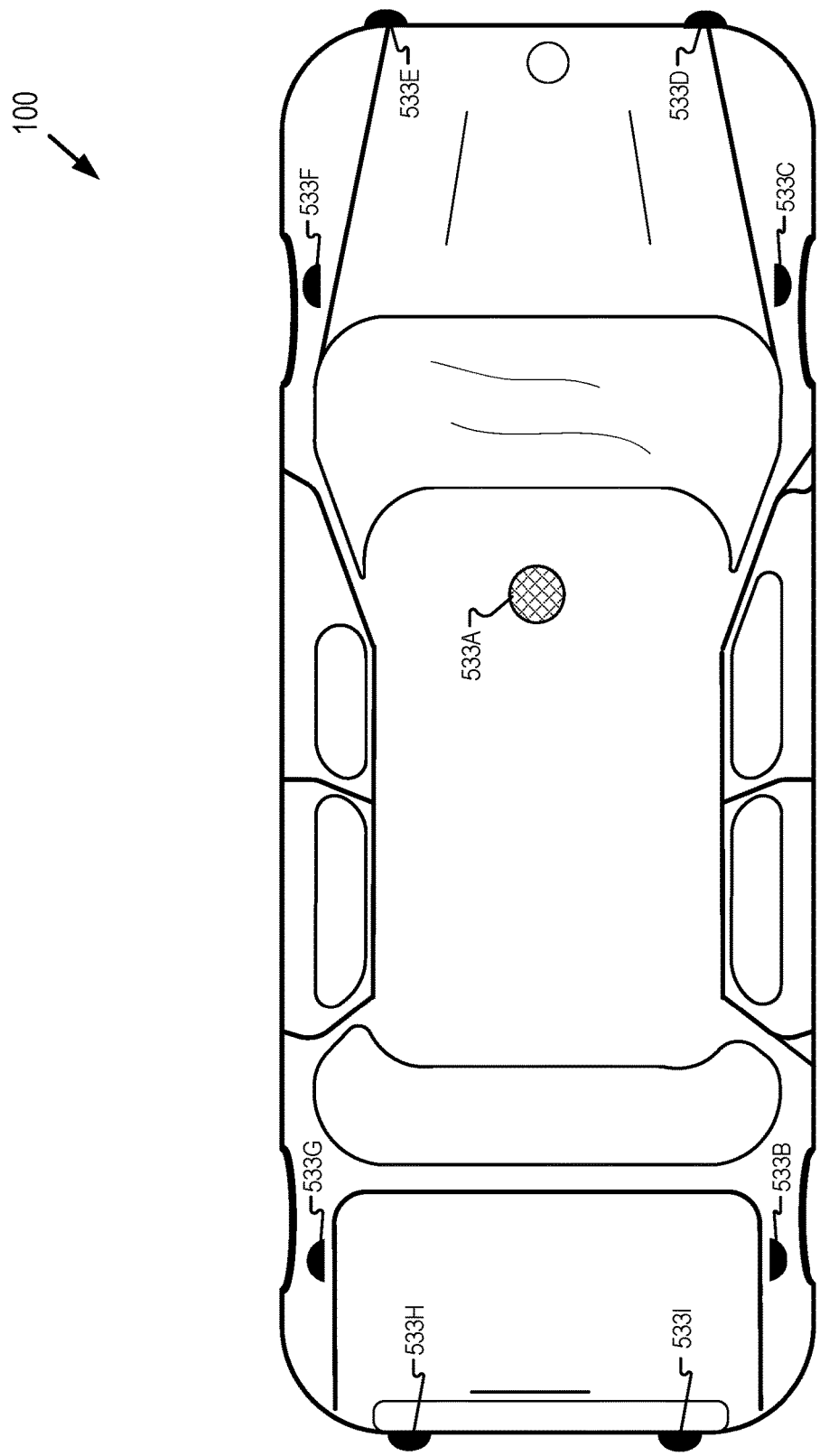
FIG. 5B illustrates a top view of an autonomous vehicle including an array of example sensors, in accordance with implementations of the disclosure.
Figure 5C:
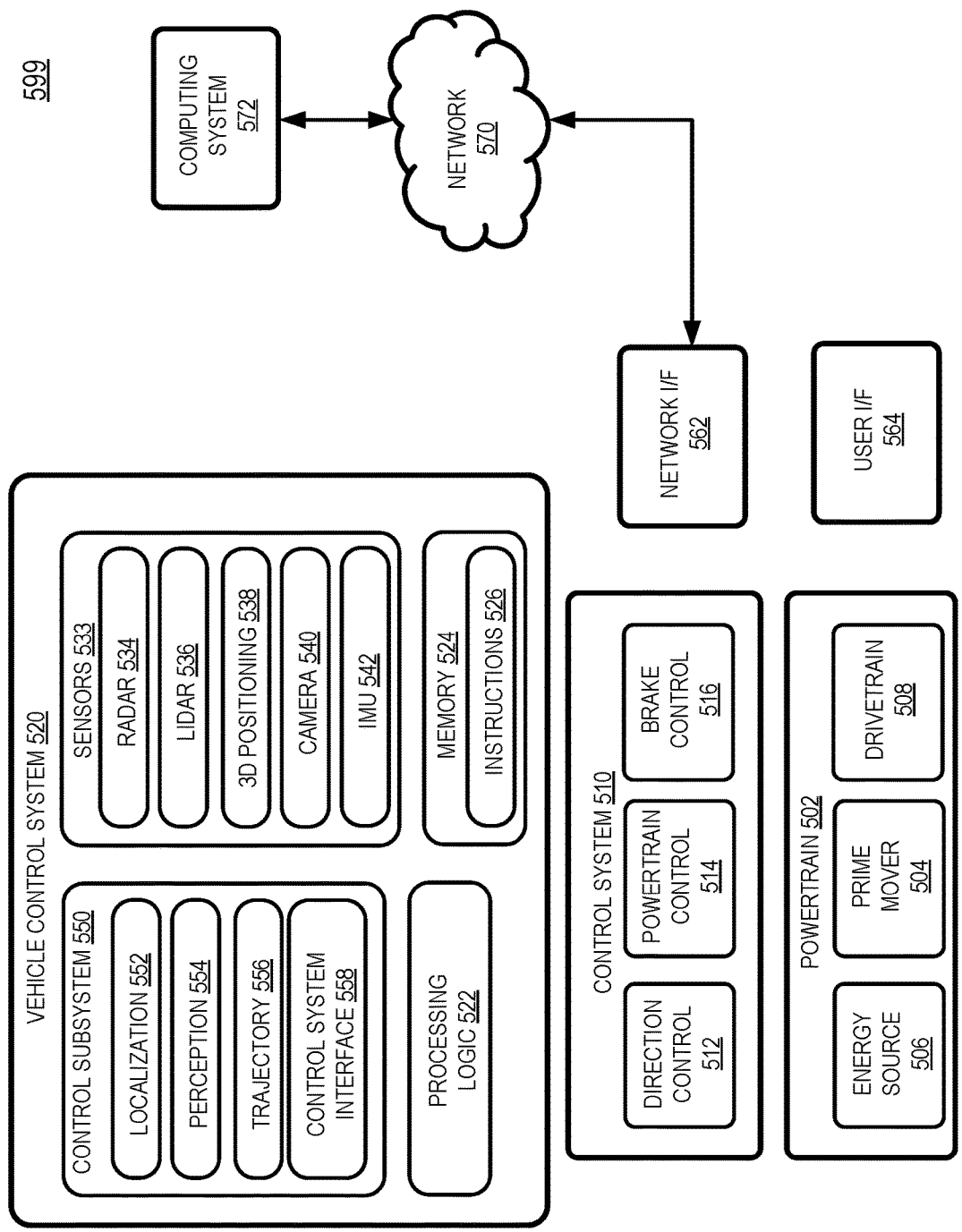
FIG. 5C illustrates an example vehicle control system including sensors, a drivetrain, and a control system, in accordance with implementations of the disclosure.

FIG. 5A illustrates an example autonomous vehicle 500 that may include the LIDAR designs of FIGS. 1-4, in accordance with aspects of the disclosure. The illustrated autonomous vehicle 500 includes an array of sensors configured to capture one or more objects of an external environment of the autonomous vehicle and to generate sensor data related to the captured one or more objects for purposes of controlling the operation of autonomous vehicle 500. FIG. 5A shows sensor 533A, 533B, 533C, 533D, and 533E. FIG. 5B illustrates a top view of autonomous vehicle 500 including sensors 533F, 533G, 533H, and 533I in addition to sensors 533A, 533B, 533C, 533D, and 533E. Any of sensors 533A, 533B, 533C, 533D, 533E, 533F, 533G, 533H, and/or 533I may include LIDAR devices that include the designs of FIGS. 1-4. FIG. 5C illustrates a block diagram of an example system 599 for autonomous vehicle 500. For example, autonomous vehicle 500 may include powertrain 502 including prime mover 504 powered by energy source 506 and capable of providing power to drivetrain 508. Autonomous vehicle 500 may further include control system 510 that includes direction control 512, powertrain control 514, and brake control 516. Autonomous vehicle 500 may be implemented as any number of different vehicles, including vehicles capable of transporting people and/or cargo and capable of traveling in a variety of different environments. It will be appreciated that the aforementioned components 502-516 can vary widely based upon the type of vehicle within which these components are utilized.

The implementations discussed hereinafter, for example, will focus on a wheeled land vehicle such as a car, van, truck, or bus. In such implementations, prime mover 504 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 508 may include wheels and/or tires along with a transmission and/or any other mechanical drive components suitable for converting the output of prime mover 504 into vehicular motion, as well as one or more brakes configured to controllably stop or slow the autonomous vehicle 500 and direction or steering components suitable for controlling the trajectory of the autonomous vehicle 500 (e.g., a rack and pinion steering linkage enabling one or more wheels of autonomous vehicle 500 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 512 may include one or more actuators and/or sensors for controlling and receiving feedback from the direction or steering components to enable the autonomous vehicle 500 to follow a desired trajectory. Powertrain control 514 may be configured to control the output of powertrain 502, e.g., to control the output power of prime mover 504, to control a gear of a transmission in drivetrain 508, thereby controlling a speed and/or direction of the autonomous vehicle 500. Brake control 516 may be configured to control one or more brakes that slow or stop autonomous vehicle 500, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 500 is implemented in vehicle control system 520, which may include one or more processors in processing logic 522 and one or more memories 524, with processing logic 522 configured to execute program code (e.g. instructions 526) stored in memory 524. Processing logic 522 may include graphics processing unit(s) (GPUs) and/or central processing unit(s) (CPUs), for example. Vehicle control system 520 may be configured to control powertrain 502 of autonomous vehicle 500 in response to an output of the optical mixer of a LIDAR pixel such as pixel 111 or 212. Vehicle control system 520 may be configured to control powertrain 502 of autonomous vehicle 500 in response to outputs from a plurality of LIDAR pixels.

Sensors 533A-533I may include various sensors suitable for collecting data from an autonomous vehicle's surrounding environment for use in controlling the operation of the autonomous vehicle. For example, sensors 533A-533I can include RADAR unit 534, LIDAR unit 536, 3D positioning sensor(s) 538, e.g., a satellite navigation system such as GPS, GLONASS, BeiDou, Galileo, or Compass. The LIDAR designs of FIGS. 1-4 may be included in LIDAR unit 536. LIDAR unit 536 may include a plurality of LIDAR sensors that are distributed around autonomous vehicle 500, for example. In some implementations, 3D positioning sensor(s) 538 can determine the location of the vehicle on the Earth using satellite signals. Sensors 533A-533I can optionally include one or more ultrasonic sensors, one or more cameras 540, and/or an Inertial Measurement Unit (IMU) 542. In some implementations, camera 540 can be a monographic or stereographic camera and can record still and/or video images. Camera 540 may include a Complementary Metal-Oxide-Semiconductor (CMOS) image sensor configured to capture images of one or more objects in an external environment of autonomous vehicle 500. IMU 542 can include multiple gyroscopes and accelerometers capable of detecting linear and rotational motion of autonomous vehicle 500 in three directions. One or more encoders (not illustrated) such as wheel encoders may be used to monitor the rotation of one or more wheels of autonomous vehicle 500.

The outputs of sensors 533A-533I may be provided to control subsystems 550, including, localization subsystem 552, trajectory subsystem 556, perception subsystem 554, and control system interface 558. Localization subsystem 552 is configured to determine the location and orientation (also sometimes referred to as the "pose") of autonomous vehicle 500 within its surrounding environment, and generally within a particular geographic area. The location of an autonomous vehicle can be compared with the location of an additional vehicle in the same environment as part of generating labeled autonomous vehicle data. Perception subsystem 554 may be configured to detect, track, classify, and/or determine objects within the environment surrounding autonomous vehicle 500. Trajectory subsystem 556 is configured to generate a trajectory for autonomous vehicle 500 over a particular timeframe given a desired destination as well as the static and moving objects within the environment. A machine learning model in accordance with several implementations can be utilized in generating a vehicle trajectory. Control system interface 558 is configured to communicate with control system 510 in order to implement the trajectory of the autonomous vehicle 500. In some implementations, a machine learning model can be utilized to control an autonomous vehicle to implement the planned trajectory.

It will be appreciated that the collection of components illustrated in FIG. 5C for vehicle control system 520 is merely exemplary in nature. Individual sensors may be omitted in some implementations. In some implementations, different types of sensors illustrated in FIG. 5C may be used for redundancy and/or for covering different regions in an environment surrounding an autonomous vehicle. In some implementations, different types and/or combinations of control subsystems may be used. Further, while subsystems 552-558 are illustrated as being separate from processing logic 522 and memory 524, it will be appreciated that in some implementations, some or all of the functionality of subsystems 552-558 may be implemented with program code such as instructions 526 resident in memory 524 and executed by processing logic 522, and that these subsystems 552-558 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 520 may be networked in various manners.

In some implementations, autonomous vehicle 500 may also include a secondary vehicle control system (not illustrated), which may be used as a redundant or backup control system for autonomous vehicle 500. In some implementations, the secondary vehicle control system may be capable of operating autonomous vehicle 500 in response to a particular event. The secondary vehicle control system may only have limited functionality in response to the particular event detected in primary vehicle control system 520. In still other implementations, the secondary vehicle control system may be omitted.

In some implementations, different architectures, including various combinations of software, hardware, circuit logic, sensors, and networks may be used to implement the various components illustrated in FIG. 5C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 500, e.g., any cache memory in a processor, as well as any storage capacity used as a virtual memory, e.g., as stored on a mass storage device or another computer controller. Processing logic 522 illustrated in FIG. 5C, or entirely separate processing logic, may be used to implement additional functionality in autonomous vehicle 500 outside of the purposes of autonomous control, e.g., to control entertainment systems, to operate doors, lights, or convenience features.

In addition, for additional storage, autonomous vehicle 500 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 500 may include a user interface 564 to enable autonomous vehicle 500 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 500 may include one or more network interfaces, e.g., network interface 562, suitable for communicating with one or more networks 570 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 500 receives environmental and other data for use in autonomous control thereof. In some implementations, data collected by one or more sensors 533A-533I can be uploaded to computing system 572 through network 570 for additional processing. In such implementations, a time stamp can be associated with each instance of vehicle data prior to uploading.

Processing logic 522 illustrated in FIG. 5C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 500 through network 570, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 5C is not intended to limit implementations disclosed herein. Indeed, those skilled in the art will recognize that other alternative hardware and/or software environments may be used without departing from the scope of implementations disclosed herein.

The term "processing logic" (e.g. processing logic 522) in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I$^2$C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A light detection and ranging (LIDAR) system comprising:
   a pixel configured to emit light having a first polarization orientation;
   a mirror configured to reflect the light to a surface;
   a birefringent material disposed between the pixel and the mirror, wherein the birefringent material causes an offset in a position of the light having the first polarization orientation and propagating through the birefringent material, and wherein the birefringent material shifts a reflected beam that has a second polarization orientation, wherein the birefringent material shifts the reflected beam in space horizontally back on the pixel, wherein a tilt angle of the birefringent material or a thickness of the birefringent material is configured for detection of objects at a detection distance of 50 meters or greater;
   a splitter configured to provide a first percentage of split light for being emitted by the pixel as the light and a second percentage of split light; and
   an optical mixer configured to generate an output by mixing the second percentage of split light with the reflected beam.

2. The LIDAR system of claim 1, the second polarization orientation being orthogonal to the first polarization orientation, and wherein the offset in the position of the light having the first polarization orientation is different from the horizontal shift of the reflected beam having the second polarization orientation.

3. The LIDAR system of claim 1, wherein the birefringent material is angled with respect to the light incident on the birefringent material, and wherein the birefringent material is tilted with respect to the reflected beam incident on the birefringent material.

4. The LIDAR system of claim 1, wherein the mirror is configured as a rotating mirror.

5. The LIDAR system of claim 1, wherein the pixel includes a dual-polarization coupler configured to:
emit the light having the first polarization orientation; and
couple the reflected beam having the second polarization orientation into the pixel.

6. The LIDAR system of claim 1, wherein the pixel includes:
a transmitting grating coupler configured to emit the light having the first polarization orientation; and
a single polarization grating coupler oriented perpendicular to the transmitting grating coupler to receive the reflected beam having the second polarization orientation into the pixel.

7. The LIDAR system of claim 1 further comprising:
a lens disposed between the birefringent material and the mirror, wherein the lens is configured to collimate the light emitted by the pixel.

8. The LIDAR system of claim 1, wherein the birefringent material includes at least one of $LiNO_3$ (Lithium Nitrate) or $YVO_4$ (Yttrium Orthovanadate).

9. An autonomous vehicle control system for an autonomous vehicle, the autonomous vehicle control system comprising:
a light detection and ranging (LIDAR) device including:
a pixel configured to emit light having a first polarization orientation, wherein the pixel includes an optical mixer configured to receive a reflected beam of the light reflecting off of objects in an environment of the autonomous vehicle;
a mirror configured to reflect the light to the objects; and
a birefringent material introducing an offset in a position of the light having the first polarization orientation propagating through the birefringent material, wherein the birefringent material shifts the reflected beam in space horizontally back on the pixel, the reflected beam having a second polarization orientation orthogonal to the first polarization orientation, wherein a tilt angle of the birefringent material or a thickness of the birefringent material is configured for detection of the objects at a detection distance of 50 meters or greater; and
one or more processors configured to control the autonomous vehicle in response to an output of the optical mixer of the pixel.

10. The autonomous vehicle control system of claim 9, wherein a tilt angle of the birefringent material and a thickness of the birefringent material are configured for detection of the objects at a detection distance of 50 meters or greater.

11. The autonomous vehicle control system of claim 9, wherein the mirror is configured as a rotating mirror.

12. The autonomous vehicle control system of claim 9, wherein the pixel includes a dual-polarization coupler configured to:
emit the light having the first polarization orientation; and
couple the reflected beam having the second polarization orientation into the pixel.

13. The autonomous vehicle control system of claim 9, wherein the pixel includes:
a transmitting grating coupler configured to emit the light having the first polarization orientation; and
a single polarization grating coupler oriented perpendicular to the transmitting grating coupler to receive the reflected beam having the second polarization orientation into the pixel.

14. The autonomous vehicle control system of claim 9, wherein the pixel includes:
a splitter configured to provide a first percentage of split light for being emitted by the pixel as the light and a second percentage of split light, wherein the optical mixer is configured to generate the output by mixing the second percentage of split light with the reflected beam.

15. The autonomous vehicle control system of claim 9, wherein the offset in the position of light having the first polarization orientation is different from the horizontal shift of the reflected beam having the second polarization orientation.

16. An autonomous vehicle comprising:
a pixel configured to emit infrared light having a first polarization orientation and configured to receive infrared reflected light reflected from objects in an environment of the autonomous vehicle;
a birefringent material introducing an offset in a position of the infrared light propagating through the birefringent material, wherein the birefringent material shifts an infrared reflected beam in space horizontally back on the pixel, the infrared reflected beam having a second polarization orientation orthogonal to the first polarization orientation, wherein a tilt angle of the birefringent material or a thickness of the birefringent material is configured for detection of the objects at a detection distance of 50 meters or greater;
a control system configured to control the autonomous vehicle in response to the infrared reflected beam; and
a rotating mirror configured to direct the infrared light to the objects while the rotating mirror is in a first position, and wherein the rotating mirror is configured to direct the infrared reflected beam back to the pixel when the rotating mirror is in a second position different from the first position.

17. The autonomous vehicle of claim 16, wherein the pixel includes a dual-polarization coupler configured to:
emit the infrared light having the first polarization orientation; and
couple the infrared reflected beam having the second polarization orientation into the pixel.

18. The autonomous vehicle of claim 16, wherein the pixel includes:
a transmitting grating coupler configured to emit the infrared light having the first polarization orientation; and
a single polarization grating coupler oriented perpendicular to the transmitting grating coupler to receive the infrared reflected beam having the second polarization orientation into the pixel.

* * * * *